July 2, 1929.  J. LAMPFERHOFF  1,719,772
PROCESS OF FORMING CERAMIC TILES, PLATES, OR THE LIKE
Filed Jan. 6, 1927
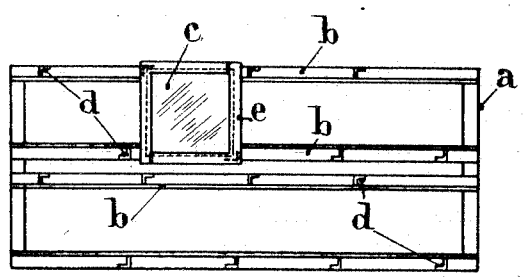
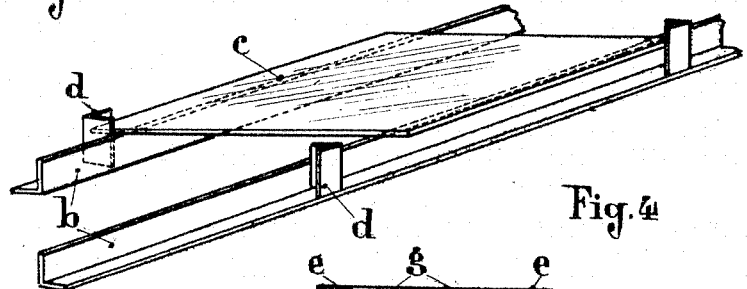
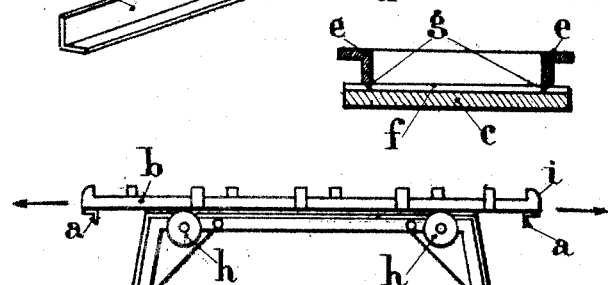
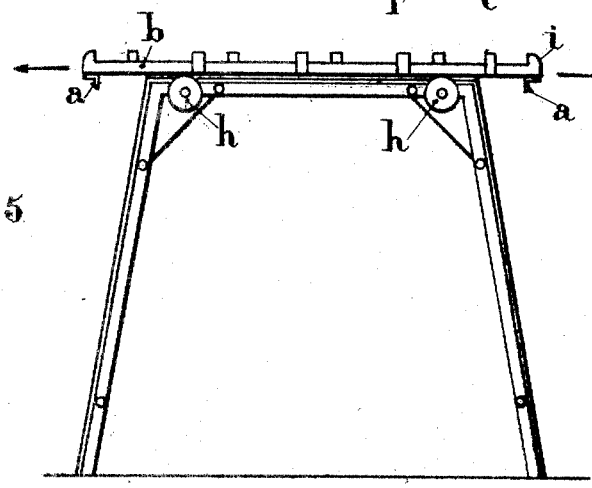
INVENTOR
J. Lampferhoff
by Lawyer, Pavy, and Sharper
Attys.

Patented July 2, 1929.

1,719,772

UNITED STATES PATENT OFFICE.

JULIUS LAMPFERHOFF, OF PARIS, FRANCE.

PROCESS OF FORMING CERAMIC TILES, PLATES, OR THE LIKE.

Application filed January 6, 1927, Serial No. 159,420, and in Great Britain January 7, 1926.

I have filed applications in France No. 258,460 dated 7th January, 1926, and Germany No. L65,739 dated 28th April, 1926.

The present invention has for its object a process for the manufacture, in the cold, of tiles or plates, glazed or varnished, and adapted for decorative coatings (imitating marble, ceramic ware or all analogous materials) for panels and artistic tableau and analogous objects.

In order to impart a better appearance to bricks and to other analogous materials of inferior quality it has already been suggested to apply thereto a coating by lining the mould, serving for the preparation thereof, with a suitable material before proceeding with the introduction of the materials for forming the brick proper, in such a manner that these will be intimately combined with the coating in question.

For the purpose of manufacturing tiles with a smooth and shiny surface it has also been suggested to outline the design on a sheet of glass (which may be placed into the mould or even form a part thereof) by using a solution at 33° Baumé, formed of five parts of magnesite, two parts of magnesium chloride, the necessary colouring agents and water. When the design is dry there is poured into the mould a mixture at 33° Baumé of one part of magnesium chloride, water, two parts of magnesia and four parts of sand or gravel.

The design formed on the glass is consequently reproduced on the surface of the tile which has a hard and shiny glaze.

According to the present invention the material serving for glazing, suitably coloured, is first applied by means of any suitable device, in the form of a perfectly uniform layer on a smooth base, such as glass (or a similar material.) There is then disposed on the said plate a moulding frame; this mould is filled in such a manner as to form the body of the tile which, when once finished, has a uniform film of glazed material.

By the use of pulverizers, the application, to the plate of glass, of the material which serves for glazing, to which colour may be added, and the use of a stencil for the reproduction of designs, the glaze is applied not only in a very short time but as a perfectly uniform layer. The process may be carried out by a more or less skilled operator.

The device used for carrying into effect the process above described enables, according to the circumstances, the manufacture of one or more plates simultaneously. This device consists essentially of a carriage and a carriage support or framework; the carriage is constructed in such a manner that the plates of glass on which the material is adapted to be spread rests on the vertical ribs of parallel angle irons, arranged in pairs and connected by cross members, the said plates receiving a frame or carriage of the mould formed by corner pieces of which the lower edges, which are dove-tailed, rest on the sheets of glass. This frame is engaged between corner pieces arranged vertically on the lower carriage in such a manner that the upper ribs of the corner pieces, forming the mould, are horizontal.

The framework which supports the whole is provided with two or more rollers on which the said carriage rests directly.

The moulding frames arranged on the carriage in question may thus receive a translating movement for the distribution of the material which serves to fill the mould.

In the accompanying drawing there is illustrated an example of construction of a device of carrying the process into effect.

Figure 1 is a plan view of the carriage with a plate of glass.

Figure 2 is a section of Figure 1.

Figure 3 shows a detail in perspective.

Figure 4 illustrates in section a moulding frame placed on a sheet of glass.

Figure 5 is an elevation of the device with the rollers on which the carriage is placed.

Referring to Figure 1 the lower carriage $i$ is formed of two angle irons $a$ on which are placed in pairs four angle irons $b$ separated in such a manner that the plates of glass $c$ can rest on the vertical ribs of the angle irons $b$.

On the horizontal ribs of the said angle irons are placed vertically corner pieces $d$ disposed in such a manner that the opposed corners, along the diagonal, of the plate of glass $c$ engage in the corner of these pieces $d$. In this manner the plates of glass $c$ and the frame of the mould $e$ may be disposed upon one or other pair of angle irons $b$.

It is thus possible to manufacture with such a carriage a number of glazed tiles at the same time.

Each plate of glass $c$ is provided with a frame $e$ comprising two halves separable diagonally of which each is formed of two corner pieces arranged at a right angle; these half frames form, as indicated in Figure 1, a moulding carriage.

The vertical ribs of the angle pieces of this mould are beveled in such a manner as to rest on the plate of glass $c$, coated with a material serving for the glazing $f$ (see Figure 4), by a knife edge $g$ and that they may serve to effect a clean cutting of the glaze on the plate of glass so as to avoid the formation of an irregular edge.

When the carriage has been completely equipped in this manner with the plates of glass $c$ and the moulding frames $e$ it suffices, after the application of the glaze to the plates of glass, to pour the filling material into the mould. By reason of the fact that the joints at the diagonal corners of the frame parts are supported in the vertical corner pieces $d$, the tiles, after hardening, will have faces which are absolutely perpendicular and are well defined by the knife edges which avoids any subsequent scraping or paring operation.

For casting the tiles the carriage is placed on the support with rollers (Figure 5) provided with rollers $h$ by means of which it is possible to uniformly distribute the material poured into the moulds by gently moving the carriage $i$. In proceeding in this manner any displacement of the glaze, which is still liquid and placed underneath the filling material, is avoided. There is also avoided the deformation of the model carrying the colour pattern which is sprayed by pulverization or by any other similar means.

In operation, the glaze is first applied to the glass plate in fluid state, with the color, if such is to be used, sprayed or otherwise suitably distributed upon the upper surface of the glaze. The mould frame is then set in place with the knife edges resting on the glaze, after which the mass forming the body of the tile is applied upon the glaze within the mould. The said mass of packing material is then settled without disturbing the facing layer of glaze by shaking the carriage $i$ together with the glass plate and the mould frame. After the settling operation the tile is allowed to become partially dried within the mould. When it has suitably solidified it is then removed from the mould and the drying process carried to completion. It is to be understood that when the mould frame is placed upon the fluid glaze, the knife edges at the base of the mould frame sink into the glaze and come into line contact with the glass plate, thus cutting off neatly the glaze of the tile from the surrounding glaze.

By this process the tiles are defined by absolutely clean surfaces thus avoiding the necessity of any subsequent trimming or paring operation.

Instead of using a plane surface of glass it will be understood that it is possible to use a plate of the same material or of another similar material having decorative designs recessed or in relief thereon, the relief being then reproduced on the surface of the tiles.

Having thus described my invention, what I claim as new and desire to secure by Letters Patent is:—

The process of forming ceramic tiles, plates, or the like, comprising spreading a facing layer upon a supporting surface, placing a mold frame having its lower side formed with knife edges upon said surface layer, causing said frame to penetrate through said surface layer to said support, filling said frame with the backing material, settling said backing material without disturbing said facing layer by shaking said support unitarily with said mold frame, removing the mold frame when the molded articles are only partly dried, and drying them completely subsequent to the removal of the molding frame.

JULIUS LAMPHERHOFF.